(12) United States Patent
Olsen et al.

(10) Patent No.: US 9,526,373 B2
(45) Date of Patent: Dec. 27, 2016

(54) PUMP AND HEATING METHOD FOR COFFEE BREWING

(71) Applicant: AS WILFA, Hagan (NO)

(72) Inventors: Tore Olsen, Kløfta (NO); Arild Jørgensen, Oslo (NO)

(73) Assignee: AS WILFA, Hagan (NO)

( * ) Notice: Subject to any disclaimer, the term of this patent is extended or adjusted under 35 U.S.C. 154(b) by 0 days.

(21) Appl. No.: 15/170,388

(22) Filed: Jun. 1, 2016

(65) Prior Publication Data
US 2016/0270590 A1 Sep. 22, 2016

Related U.S. Application Data

(62) Division of application No. 14/322,354, filed on Jul. 2, 2014.

(51) Int. Cl.
A47J 31/56 (2006.01)
A47J 31/00 (2006.01)
A47J 31/46 (2006.01)
A23F 5/26 (2006.01)

(52) U.S. Cl.
CPC ............... *A47J 31/56* (2013.01); *A23F 5/26* (2013.01); *A47J 31/002* (2013.01); *A47J 31/465* (2013.01)

(58) Field of Classification Search
CPC ........ A47J 31/002; A47J 31/56; A47J 31/465; A23F 5/26
See application file for complete search history.

(56) References Cited

U.S. PATENT DOCUMENTS

| 5,014,611 | A | 5/1991 | Illy et al. |
| 5,440,972 | A | 8/1995 | English |
| 5,549,035 | A | 8/1996 | Wing-Chung |
| 5,738,001 | A | 4/1998 | Liverani |
| 6,000,317 | A | 12/1999 | Van Der Meer |
| 6,082,245 | A | 7/2000 | Nicolai |
| 8,418,601 | B2 | 4/2013 | Magg et al. |

(Continued)

FOREIGN PATENT DOCUMENTS

| EP | 0771542 A1 | 5/1997 |
| JP | 1141613 A | 6/1989 |

OTHER PUBLICATIONS

Office Action dated Jul. 29, 2016, for U.S. Appl. No. 14/322,354, filed Jul. 2, 2014, 10 pages.

*Primary Examiner* — Anthony Weier
(74) *Attorney, Agent, or Firm* — Christopher & Weisberg, P.A.

(57) ABSTRACT

A method and system for brewing coffee that allows for control of the temperature of the water as it hits ground coffee and that is adapted for changes in the environment. A coffee machine may include: a water reservoir, a pump, a heating element, a filter holder, a temperature sensor, and a control element. Instead of using boiling water to drive the flow of water from the water container to the filter holder, which method relates the outlet temperature to the water's boiling point, which, in turn, is dependent on altitude and other factors, the coffee machine described herein uses a pump to deliver water from the water container to the heating element and on to the filter holder. The coffee machine also includes a heating element that is not susceptible to frost damage, which may include a silicone layer sandwiched between two metal components, such as aluminum blocks.

11 Claims, 13 Drawing Sheets

(56) References Cited

U.S. PATENT DOCUMENTS

| | | |
|---|---|---|
| 2005/0066820 A1 | 3/2005 | Lussi |
| 2005/0236431 A1 | 10/2005 | Rahn |
| 2006/0005712 A1 | 1/2006 | Greenwald et al. |
| 2008/0017044 A1 | 1/2008 | Magg et al. |
| 2008/0028947 A1 | 2/2008 | Magg et al. |
| 2008/0037968 A1 | 2/2008 | Kaastra |
| 2009/0000488 A1 | 1/2009 | Magg et al. |
| 2009/0255408 A1 | 10/2009 | Lassota et al. |
| 2009/0312879 A1 | 12/2009 | Quah |
| 2010/0112165 A1 | 5/2010 | Masciandaro et al. |
| 2010/0221394 A1 | 9/2010 | Gaulard et al. |
| 2010/0282088 A1 | 11/2010 | Deuber et al. |
| 2012/0073447 A1 | 3/2012 | Cid |
| 2013/0202279 A1 | 8/2013 | Reichl et al. |
| 2013/0344205 A1 | 12/2013 | Oh |
| 2014/0053734 A1 | 2/2014 | Santi |
| 2014/0272025 A1 | 9/2014 | Wheeler |
| 2014/0305313 A1 | 10/2014 | Waldron et al. |
| 2015/0157168 A1 | 6/2015 | Burrows |
| 2016/0000252 A1* | 1/2016 | Olsen .................. A47J 31/002 426/231 |

\* cited by examiner

PUMP AND HEATING METHOD FOR COFFEE BREWING

CROSS-REFERENCE TO RELATED APPLICATION

This application is a divisional of U.S. patent application Ser. No. 14/322,354, filed Jul. 2, 2014, entitled "PUMP AND HEATING METHOD AND ARRANGEMENT FOR COFFEE BREWING", the entirety of which is incorporated herein by reference.

STATEMENT REGARDING FEDERALLY SPONSORED RESEARCH OR DEVELOPMENT n/a

FIELD OF THE INVENTION

The present invention relates to a coffee machine, more precisely a pump and heating system and a method for preparing coffee.

BACKGROUND OF THE INVENTION

In the following, the function of a traditional coffee machine will be described. Note that the term "coffee machine" also includes "coffee brewer" and "coffee maker" in the following discussion.

A traditional coffee maker normally works by admitting water from a cold water reservoir into a flexible hose in the base of the reservoir leading directly to a thin metal tube or heating chamber (usually, of aluminum), where a heating element surrounding the metal tube heats the water. The heated water moves through the machine using the thermo siphon principle. Thermally-induced pressure and the siphoning effect move the heated water through an insulated rubber or vinyl riser hose, into a spray head, and onto the ground coffee, which is contained in a brew basket mounted below the spray head. The coffee passes through a filter and drips down into the carafe. A one-way valve in the tubing prevents water from siphoning back into the reservoir. A thermostat attached to the heating element turns off the heating element as needed to prevent overheating the water in the metal tube (overheating would produce only steam in the supply hose), then turns back on when the water cools below a certain threshold.

It is crucial for the quality of the coffee that the water temperature as it hits the ground coffee is properly adjusted. Too low or too high a temperature will degrade the taste of coffee. Ninety-two degrees Celsius is often referred to as the ideal outlet temperature. The problem with prior art coffee makers is that even if they control of the temperature as it leaves the heater, there is no actual control of the temperature as the water hits the ground coffee. This is partly because traditional coffee makers use steam as a driving force for water movement between the water tank and filter holder. Further, coffee makers are not adapted to changes in the environment related to pressure, humidity and temperature, in addition to being poorly protected against frost damage that may occur in the piping in and around the heating element. Frost damage typically occurs if a machine is used in a house that is not insulated winter, and when the coffee is maker not emptied of water.

It is therefore desired to provide a coffee machine that allows for control of the temperature of the water as it hits the ground coffee and that is adapted for changes in the environment.

SUMMARY OF THE INVENTION

The present invention advantageously provides a method and system for brewing coffee that allows for control of the temperature of the water as it hits the ground coffee and that is adapted for changes in the environment. A method for brewing coffee in a coffee machine including a water reservoir, a heating element a water pump, and a coffee flask with a filter holder positioned above the coffee flask, may include: measuring an ambient temperature in the coffee machine with a temperature sensor; estimating a temperature reduction of water from the heating element to the filter holder using a predefined model; providing power to the heating element, the heating element heating water from the water tank, the water then passing from the heating element through a conduit to the filter holder; when a temperature of said heating element reaches a first predefined temperature, activating the water pump for a first time interval until the heating element is filled with water; disabling the water pump for a second time interval until the temperature of the water in the heating element has reached a second predefined temperature; estimating a throughput level in the heating element that provides a predefined output temperature of the water when the water contacts ground coffee beans contained in the filter holder, the throughput level being based on the estimated temperature reduction and measured ambient temperature; and activating the water pump with a voltage level that provides the estimated throughput level. The method may further include: monitoring an actual temperature reduction, and if the actual temperature reduction differs significantly from the estimated temperature reduction, then: estimating a modified throughput level in the heating element that provides the predefined output temperature of the water when the water contacts the ground coffee beans contained in the filter holder using an adjusted estimated temperature reduction based on an adjusted predefined model and the measured ambient temperature; and altering the pump voltage level to a different voltage level that provides the estimated modified throughput level. The second predefined temperature may be equal to the first predefined temperature. Further, the predefined output temperature may be in the range of between approximately 90° C. and approximately 96° C. The second time interval may be equal to the first time interval, and the first time interval may be, for example, approximately two seconds. The heating element may include one or more metal elements and one or more silicone layers in thermal contact with the one or more metal elements, the one or more silicone layers defining one or more channels through the thermal element from which the water flows into the conduit. For example, the heating element may include two metal elements (composed of a metal such as aluminum), with the one or more silicon layers being positioned between the two metal elements. The filter holder may include a rotatable ring for aroma control, and the coffee machine may also include a water outlet for dispensing water onto the ground coffee contained in the filter holder.

A machine for brewing coffee may generally include a water reservoir, a pump and a heating element in fluid communication with the water reservoir, a temperature sensor, and a control element in communication with the pump, the temperature sensor, and the heating element. The temperature sensor may be configured to measure an ambient temperature in the machine and measure a temperature of the heating element. The machine may further include a filter holder in fluid communication with the heating element. The control element may be programmed to: estimate a reduction in a temperature of water within the heating element and a temperature of the water as it is delivered to the filter holder from the heating element; activate the pump for a first period of time to deliver water from the water reservoir to the heating element when the temperature sensor measures a temperature of the heating element that is equal to or greater than a first predefined temperature; and disable the pump for a second period of time until the temperature sensor measures a temperature of water within the heating element that is equal to or greater than a second predefined temperature. The control element may further be programmed to: estimate a throughput level in the heating element that provides a predefined output temperature of the water when the water is delivered to the filter holder from the heating element, the throughput level being based at least in part on the estimated reduction in temperature and measured ambient temperature; and activate the pump with a voltage level that provides the estimated throughput level. The control element may further be programmed to: monitor an actual reduction in the temperature of water within the heating element and the temperature of the water as it is delivered to the filter holder from the heating element, the actual reduction based at least in part on temperature measurements received from the temperature sensor; estimate a modified throughout put level in the heating element that provides the predefined output temperature of the water when the water is delivered to the filter holder using an adjusted estimated temperature reduction based on an adjusted predefined model and the measured ambient temperature; and adjust the pump voltage level to a different voltage level that provides the estimated throughput level. As a non-limiting example, the predefined output temperature may be between approximately 90° C. and approximately 96° C. The heating element may include a first aluminum element and a second aluminum element and one or more silicone layers between and in thermal contact with the first aluminum element and the second aluminum element, the one or more silicone layers defining one or more channels through the thermal element that are in fluid communication with the water reservoir.

A machine for brewing coffee may include: a water reservoir; a pump and a heating element in fluid communication with the water reservoir; a filter holder in fluid communication with the heating element; a temperature sensor; and a control element in communication with the pump, the temperature sensor, and the heating element, the control element being programmed to: estimate a reduction in a temperature of water within the heating element and a temperature of the water as it is delivered to the filter holder from the heating element; activate the pump for a first period of time to deliver water from the water reservoir to the heating element when the temperature sensor measures a temperature of the heating element that is equal to or greater than a first predefined temperature; disable the pump for a second period of time until the temperature sensor measures a temperature of the heating element that is equal to or greater than a second predefined temperature; estimate a throughput level in the heating element that provides a predefined output temperature of the water when the water is delivered to the filter holder from the heating element, the throughput level being based at least in part on the estimated reduction in temperature and measured ambient temperature; and activate the pump with a voltage level that provides the estimated throughput level.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

In the following, example embodiments are described by referring to the accompanying drawings.

Figure 1:
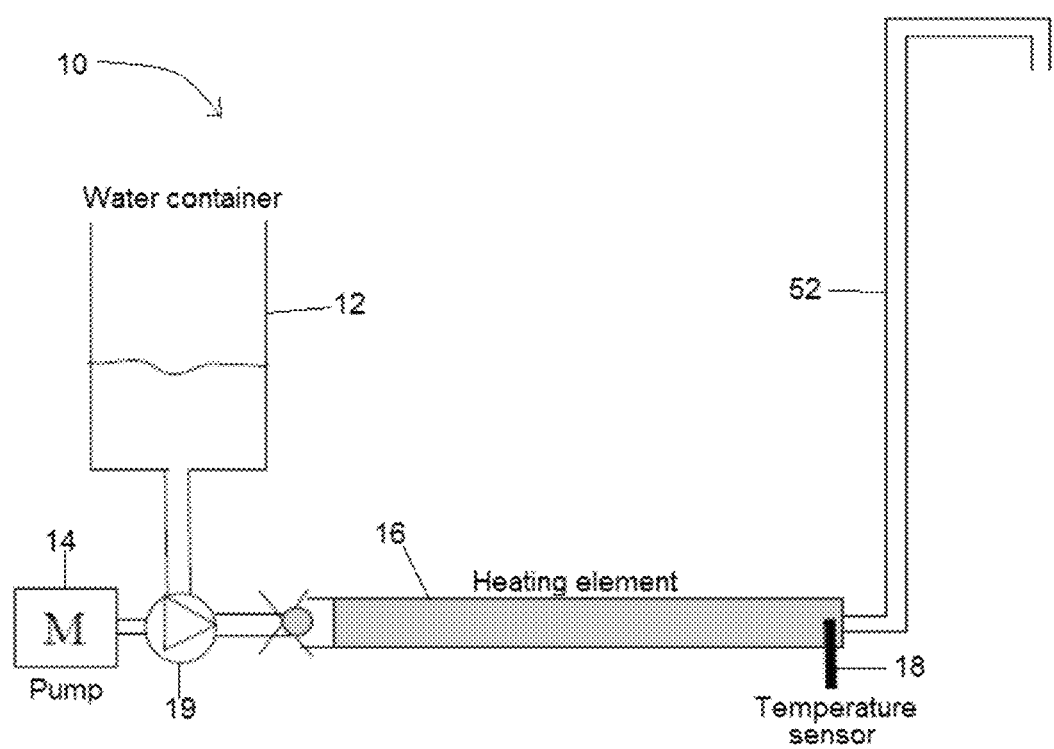
FIG. 1 shows a schematic diagram of a coffee machine.

FIG. 1 shows elements of one embodiment of the coffee machine 10. The coffee machine 10 may generally include a water tank or container 12, a pump 14, a heater (heating element) 16 and a temperature sensor 18.

In the following, the different parts of a coffee machine according to the presented embodiment are discussed in greater detail with reference to the FIGS. 2-13.

Figure 2:
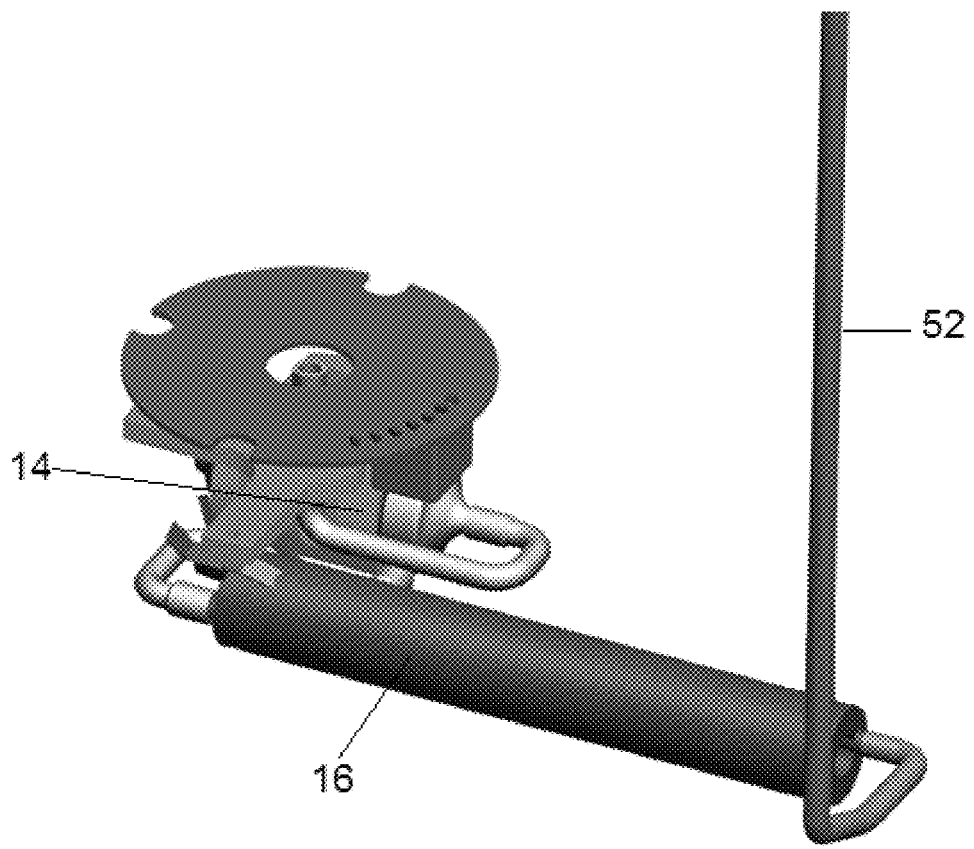
FIG. 2 shows a pump and heating element of the coffee machine.
Figure 3:
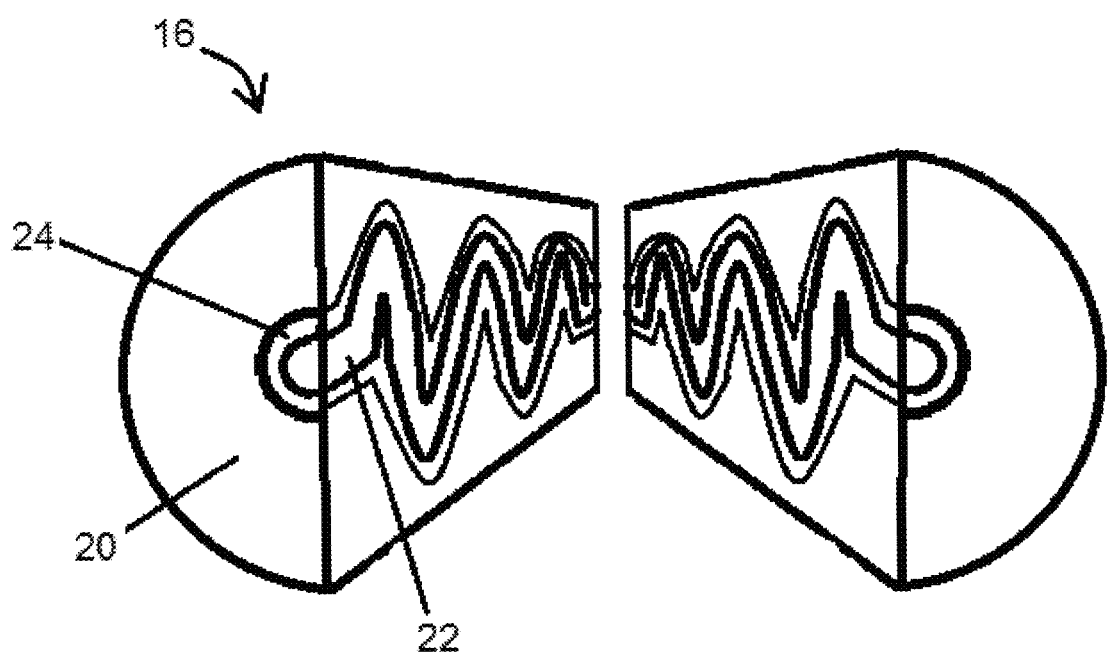
FIG. 3 shows a cutaway view of an exemplary heating element having water channels.

FIG. 2 shows an example of the pump 14 and the heating element 16 with control functions. The pump 14 should be able to empty the water container 12 and a heating element 16. It should have a low noise level and a life cycle of at least 10 years. It may be, for example, a peristaltic pump, vane pump or centrifugal pump. The heating element 16 should be able to heat at least 1.2 liters of water in approximately four minutes, but at the same time require a relatively small space. Exemplary heating elements may include standard flat elements, flow-through elements or a block of aluminum element 20 which, in turn, may have channels 22 formed in a silicon layer 24 through which the water flows. For example, a cutaway view of an exemplary heating element 16 including channels 22 with a silicone layer 24 is shown in FIG. 3. In addition, there must be a system control element 19, such as a process control block (PCB) that can control the heating element 16 according to a flow rate of about 300 cc/min, which is able to adjust the water temperature in the range of approximately 91° C. to approximately 97° C. The PCB 19 may be in communication with the temperature sensor 18 and the heating element 16, such that the PCB 19 may receive measurements from the temperature sensor 18 of, for example, an ambient temperature in the coffee machine 10 and/or a temperature of the heating element 16 and use that data to, for example, estimate a temperature reduction of water from the heating element 16 to ground coffee waiting to be brewed, activate the pump 14 for a period of time when the temperature of the heating element 16 reaches a predetermined level, disable the pump for a period of time, instructing the provision of power from a power source to the heating element 16 and/or pump 14, estimating a throughput level in the heating element 16 that provides a predetermined output temperature of the water, and the like.

The coffee machine 10 should preferably also have some kind of frost protection. Frost protection can be achieved by the heating element 16 consisting of two aluminum elements 20 with a silicone layer 24 between, where said channel 22 is formed. Such an arrangement will provide efficient heating of the water through heat transfer from the aluminum blocks 20 to the water through the silicon layer 24. Also, the silicone should have features that allow it to expand and contract so that the heating element 16 is less susceptible to frost damages when there is water remaining in the channels. Silicon also has the advantage of being thermally stable, water resistance, and having a good electrical insulation and being chemically reactive.

Figure 4:
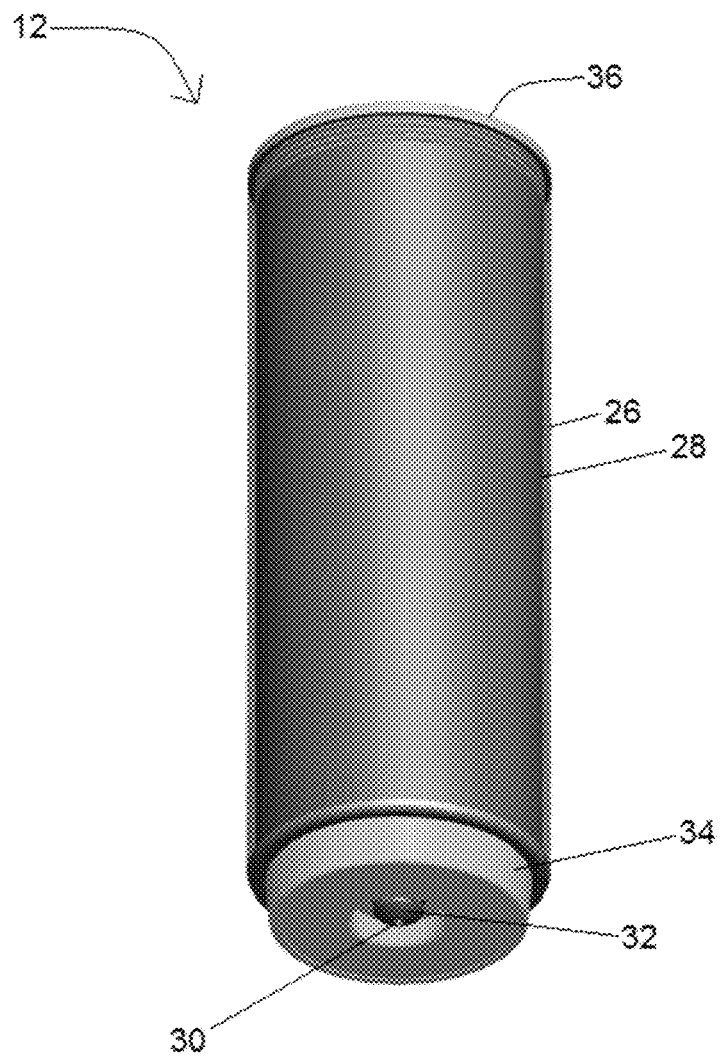
FIG. 4 shows a water container for the coffee machine.

FIG. 4 shows an example of a water container 12. The container 12 may include an outer container 26, an internal container 28, a valve 30, a spring valve 32, a shelf 34, a lid 36, and a decorative cover. The water container 12 should be easily disassembled for filling water and easily replaced in the socket. It should be able to accommodate approximately 1.2 liters of water, and should be placed on a table without the risk of opening the valves 30, 32 to allow water to leak out. It should also be dishwasher safe.

Figure 5:
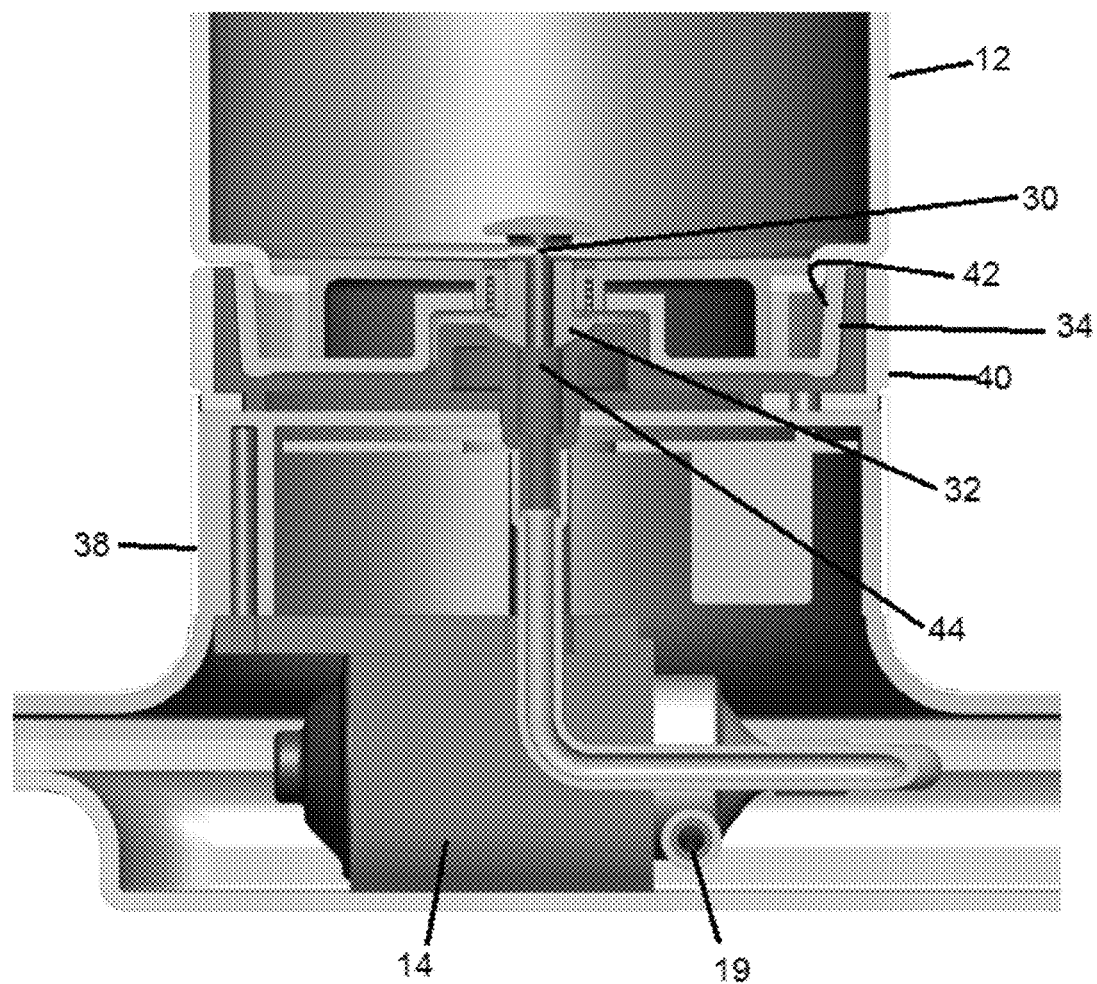
FIG. 5 shows a close-up view of the water container seated in a coffee-holder base.

FIG. 5 is an illustration of how the water container 12 is placed in the coffee-holder base 38. The base 38 should have a foundation 40 in the form of a recess 42 which fits the container 12 so that it remains firmly with any locking mechanism when it is inserted into the foundation 40. Furthermore, it should be a valve hole 44 in the foundation 40 which is designed to open the valve 32 and allow water to flow freely into the pump 14 which is preferably positioned directly below the foundation 40. Pump 14 and PCB 19 may also be located directly below the foundation 40.

Figure 6:
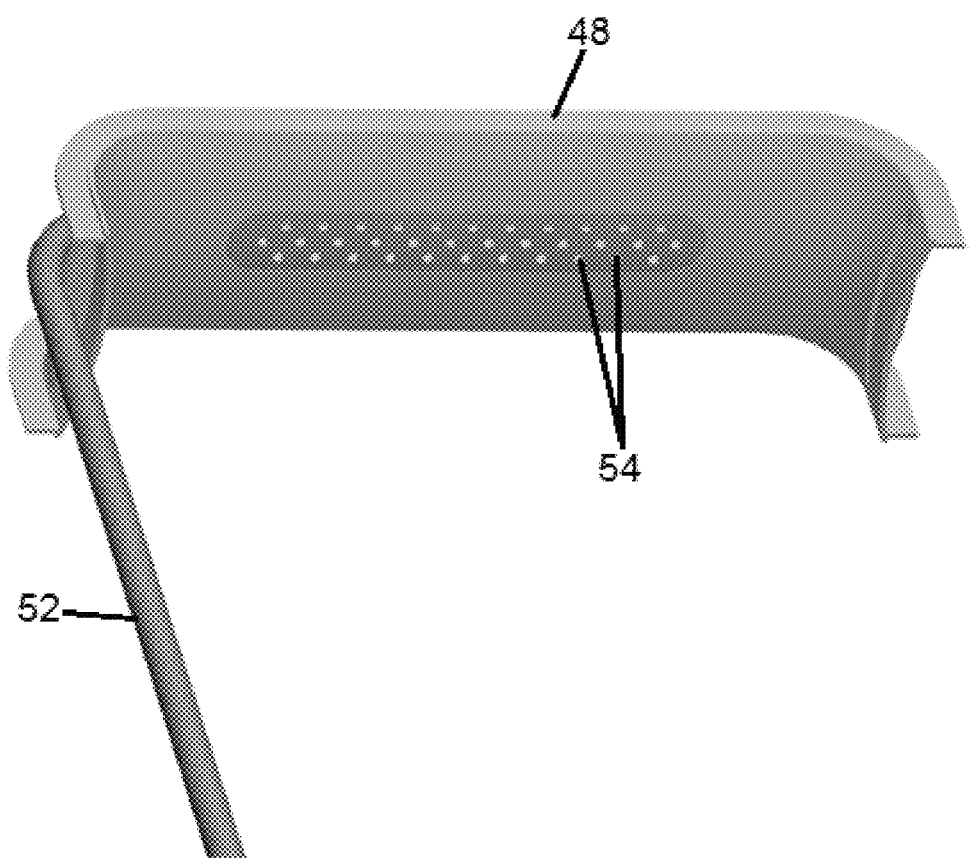
FIG. 6 shows a water outlet mounted above a filter holder of the coffee machine.

FIG. 6 shows a shower head-shaped water outlet 48 that is mounted above the filter holder 50. The water outlet 48 is designed as a shower head to achieve a good distribution of water over the ground coffee in the filter holder 50. The water outlet 48 should be easy to disassemble and clean. The water outlet 48 is connected to a water conduit 52 from the heating element 16 and may include a plurality of ports 54 for delivering the water onto the ground coffee.

Figure 7:
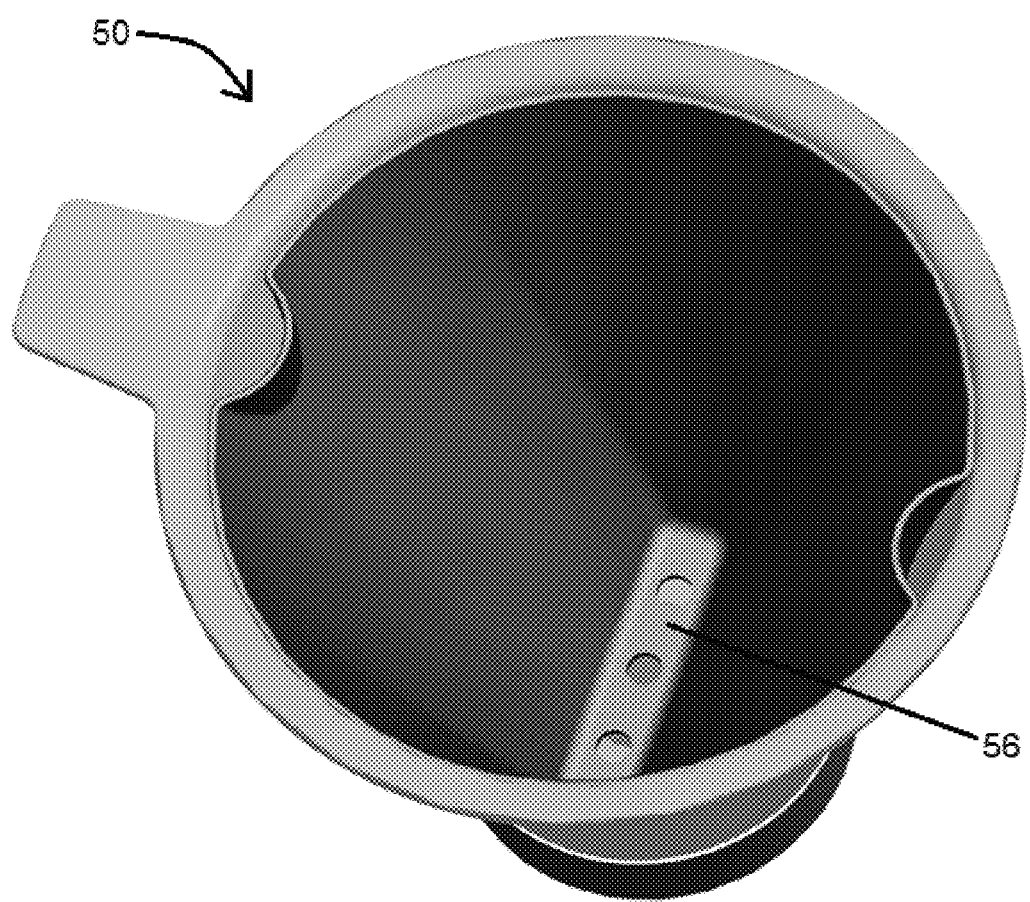
FIG. 7 shows the filter holder.

FIG. 7 shows of a filter holder 50 which may be used in connection with the coffee machine 10. The filter holder 50 is designed to direct water toward the filter bottom 56. It should be easy to assemble and disassemble, and easy to clean.

Figure 8:
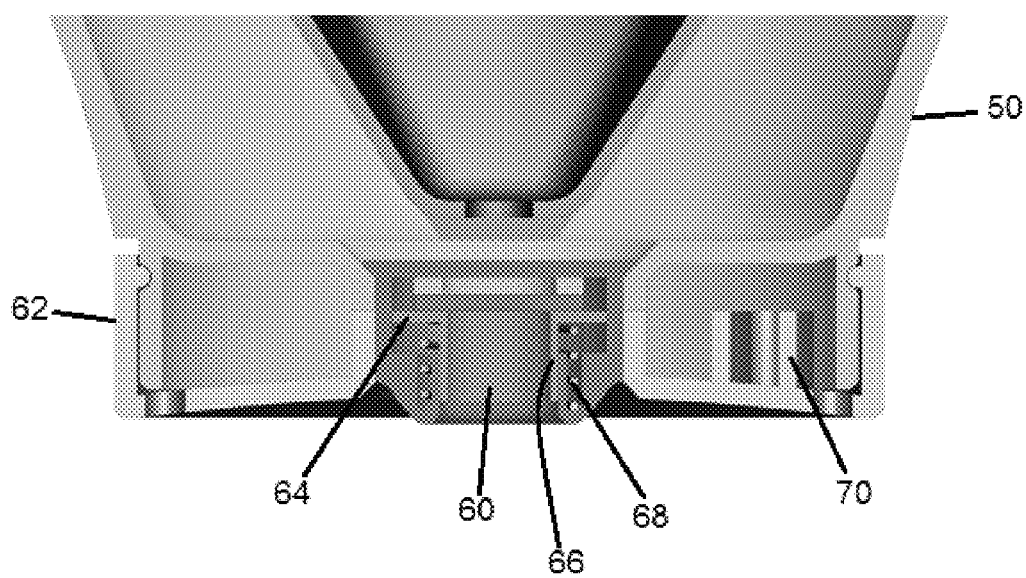
FIG. 8 shows a close-up view of a base of the filter holder.

FIG. 8 shows a base 58 of a filter holder 50, which can be used in connection with the coffee machine 10. The filter holder base 58 consists of a valve 60, a rotatable ring 62 for aroma control, a slider 64, a telescopic ring 66, and a spring element 68. The base 58 should be adjusted so that when the filter holder 50 is removed from the coffee machine's bracket, the valve 60 will close and prevent the coffee from running out from the bottom of the filter holder 50. It should also be possible to place the filter holder 50 on a surface without the coffee running out from the bottom of the filter holder 50.

Figure 9:
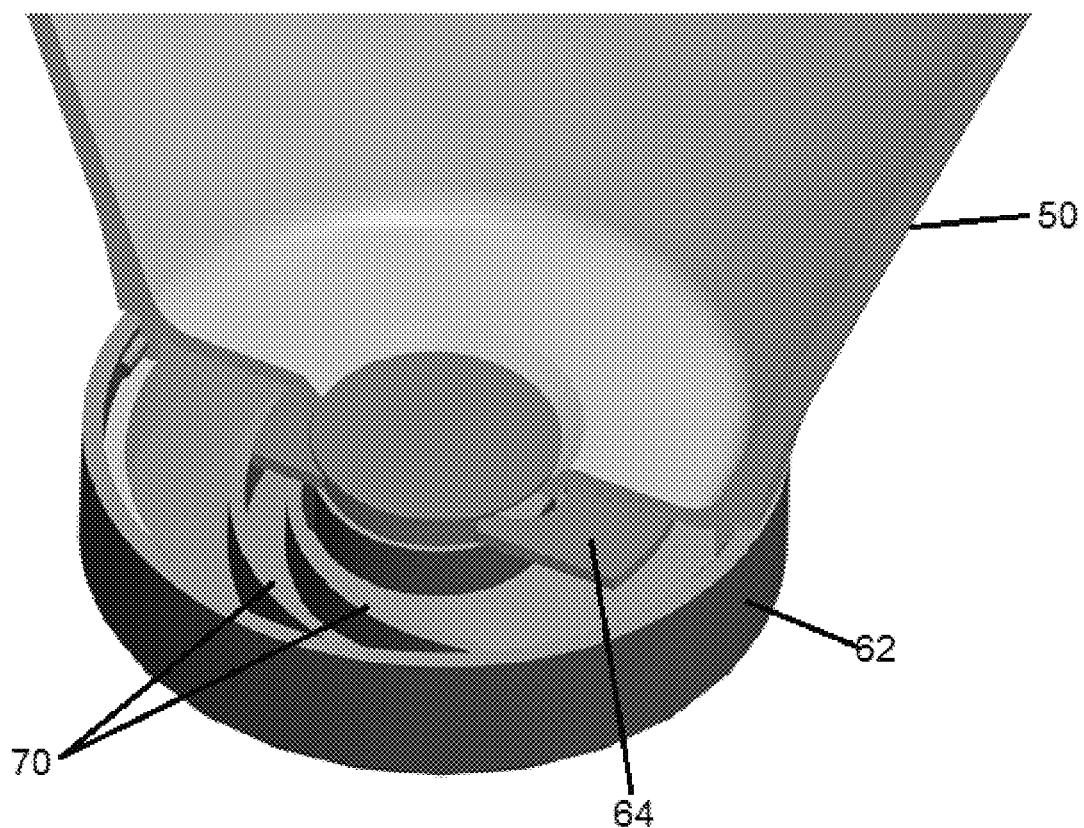
FIG. 9 shows a close-up view of a filter holder aroma control mechanism.

FIG. 9 shows the filter holder aroma control mechanism in more detail. The aroma control mechanism consists of a rotatable adjusting ring 62 with threads 70 of the slider 64. By rotating the ring 62, the slider 64 is twisted, and the speed of the water flow will change. The valve 60 should not be closed completely, but always have a minimum opening while it is placed on the bracket to prevent coffee or water overflows.

Figure 10:
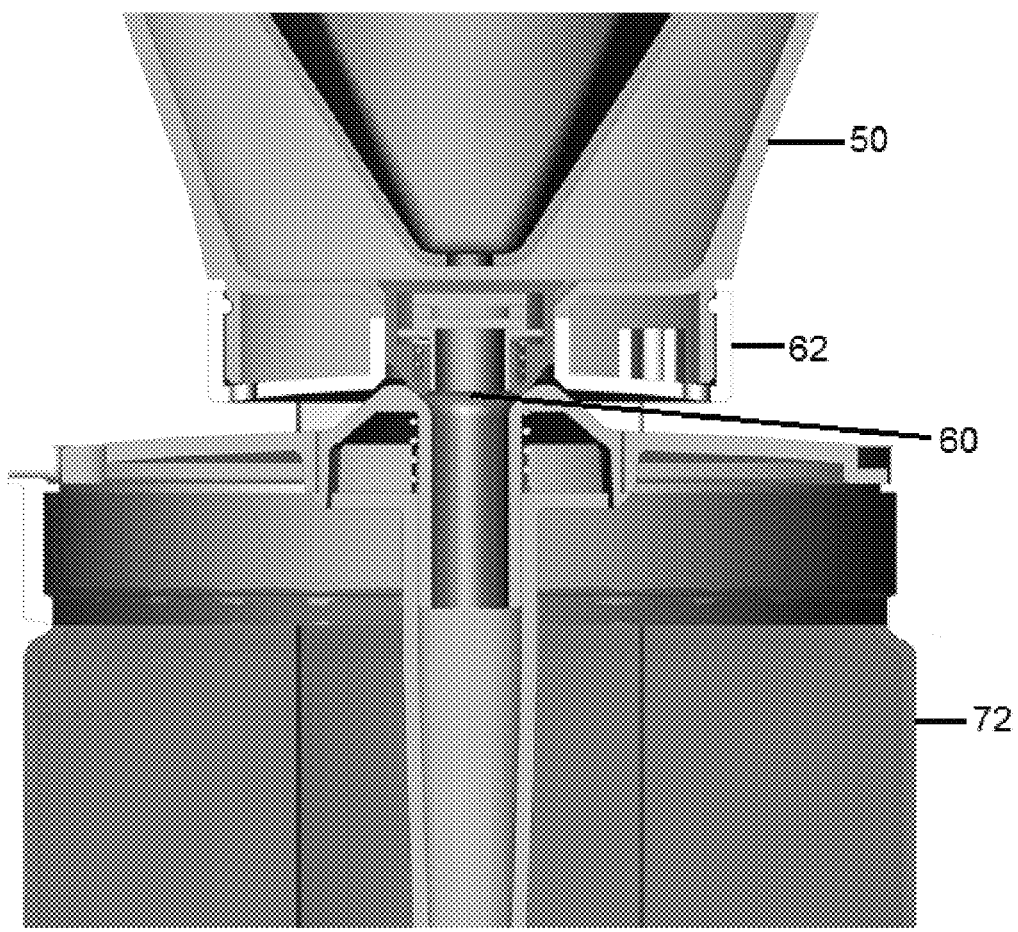
FIG. 10 shows a close-up view of the filter holder and a coffee flask for use with the coffee machine.

FIG. 10 shows the connection between the filter holder 50 and a coffee flask or carafe 72 in more detail. The valve 60 opens when the coffee flask 72 is placed under the filter holder 50, so that the coffee can flow into the coffee flask 72. Likewise, the valve 60 closes when the coffee flask 72 is removed so that the coffee is no longer flowing out of the filter holder 50. The flow rate of water from the filter holder 50 should always be higher than the water flow rate from the pump 14 into the filter holder 50.

Figure 11:
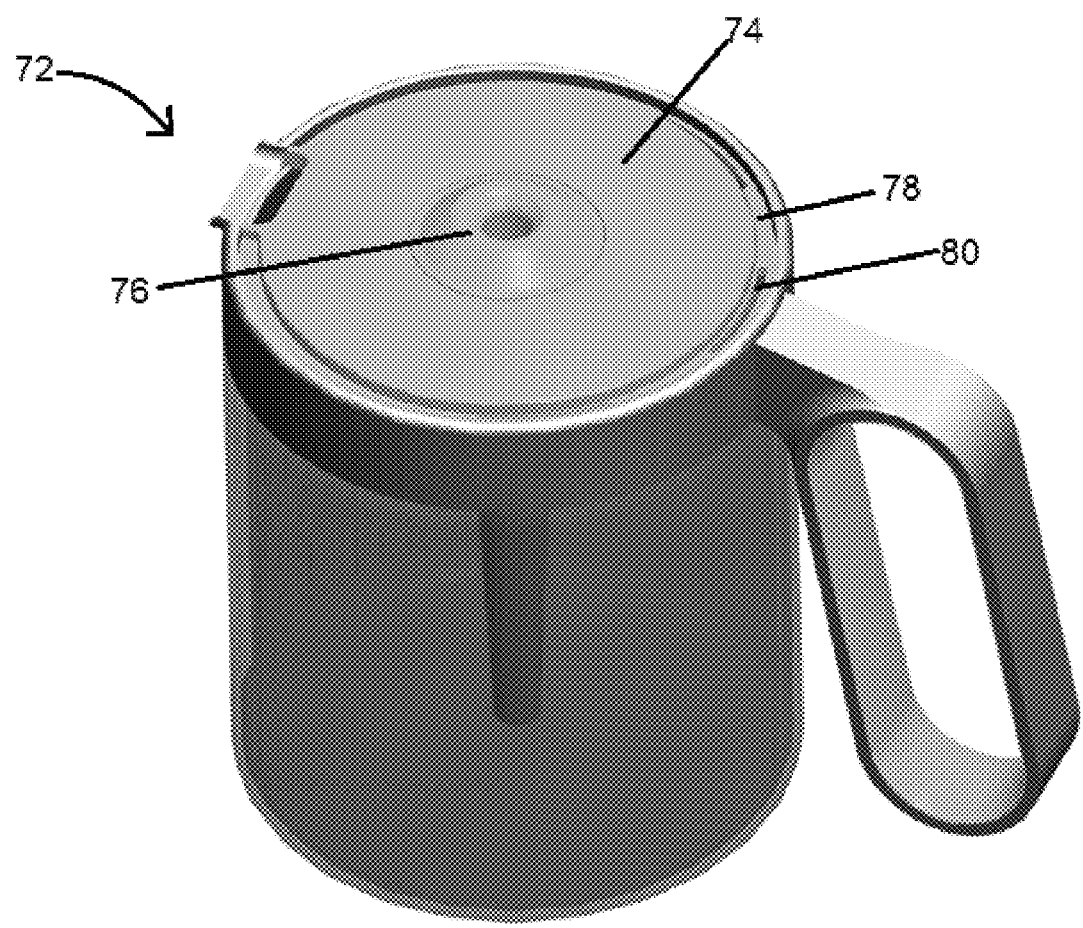
FIG. 11 shows an exemplary coffee flask for use with the coffee machine.

FIG. 11 shows an exemplary coffee flask 72 that can be used in connection in the coffee machine 10. In approximately the middle of the lid 74 of the coffee flask 72 there is a lifting mechanism 76 to activate the valve 60 in the bottom of the filter holder 50. The coffee flask lid 74 is also equipped with a drip stop 78 along the edge with drainage holes 80 down to the flask.

Figure 12:
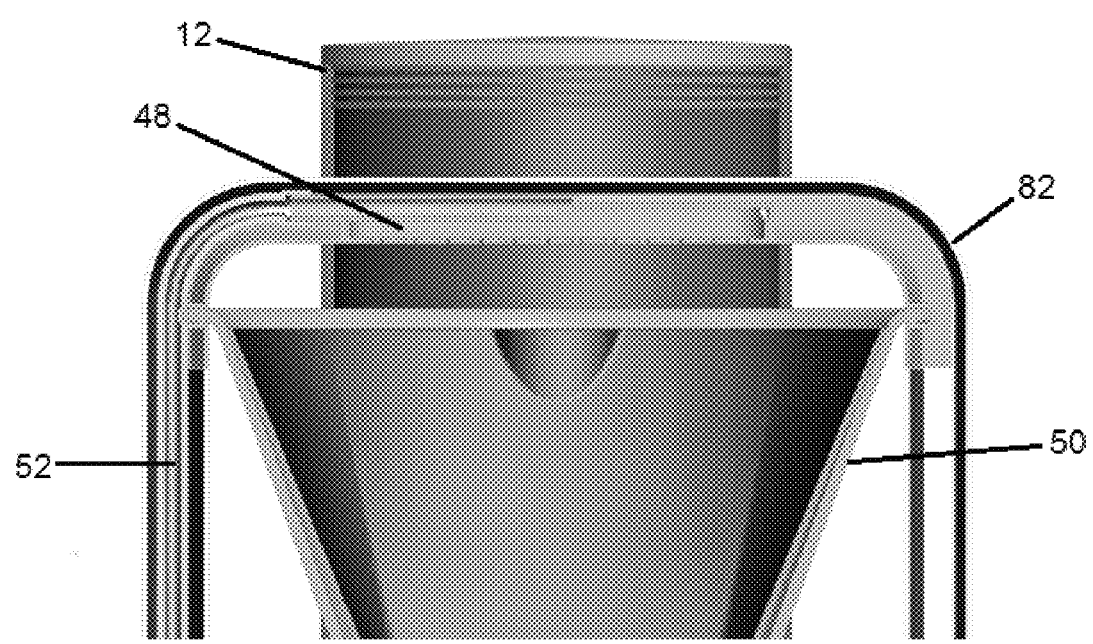
FIG. 12 shows a filter support bracket.
Figure 13:
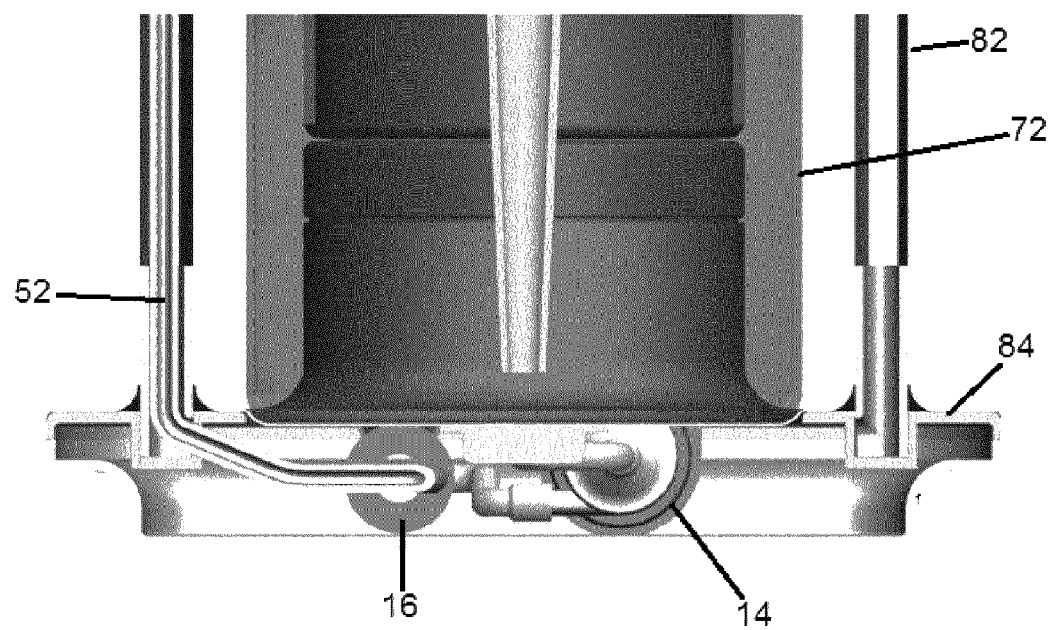
FIG. 13 shows a filter support bracket base.

FIGS. 12 and 13 show examples of a filter holder support bracket 82 and the bracket base 84 respectively.

In the following, the functions and assemblies according to various embodiments of the present invention are discussed in more detail.

The purpose of the pump 14 is to control the outlet water temperature more precisely and partially independent of the use of different altitudes and barometric pressures. The goal is to have a controlled outlet temperature of, for example, 92° C. The outlet temperature of the water may preferably also be changed by the user, for example within a range of approximately 90° C. to approximately 99° C.

At a low pressure, the water boils earlier than at a higher pressure. At a low barometric pressure, the boiling point will be at approximately 2° C. to approximately 3° C. lower compared with an average barometric pressure. Further, an altitude of 1000 feet above mean seal level (MSL) will lower the boiling point by about 3° C.

The traditional structure of a coffee machine uses boiling water to drive the flow of water from the container to the filter holder 50. Thus, the outlet temperature will be related to the boiling point, and might be approximately 6° C. below the boiling point. The temperature drop is partly due to heat loss to the surroundings through the various components of the machine 10. Furthermore, the heating element is often designed so that the heat supply is uneven. This creates steam in the water, although the average temperature is a few degrees below the boiling point.

By being able to control the flow through the heating element by means of the pump, so the temperature may partly be controlled independently. The outlet temperature from the heating element may thus be, for example, 94° C., then controllably allowing a temperature drop of approximately 2° C. from the heater to the funnel.

However, this may imply that in certain cases is not possible to get the desired temperature, when the boiling point has dropped significantly due barometric pressure and/or elevation. Then it becomes necessary to lower the discharge temperature to a level where the heating may occur at an acceptable level of vapors.

Several pump types are possible to achieve the desired function, including centrifugal pumps, peristaltic pumps, vane pumps, and gear pumps. Only the peristaltic pump and to some extent the gear pump are also able to pump air. When the system is not empty, there may be residual water in the system, which can cause bacterial growth and possible frost rings.

Frost-induced leaks can be avoided by providing spaces or tubes containing water that are able to expand by approximately 10%. With regard to bacterial growth, it is considered that the solution should be comparable with other coffee machines, which also accommodate for residual water left in the pipes and the heating element.

When this is the basis for selection of the pump, the preferred choice seems to be the centrifugal pump. It does not have the best characteristics of the desired function, as it is difficult to use for dosing and requires a check valve. The features are, however, sufficient for the purpose herein, and it is relatively inexpensive to produce because it does not have many moving parts.

In a preferred embodiment, a 12-volt automotive sprinkler pump is utilized. It is produced in large quantities and has a lower price than most other pumps.

In the embodiment herein, when a centrifugal pump is used, a check valve is also required if the heating element 16 is to be emptied after brewing. The check valve might also contain an aperture, so the flow through the aperture/pump can be varied more precisely. Alternatively, the pump/directional valve might be some kind of a needle valve, so that an automatic purification of deposits in the valve could be achieved. Spring-loading is considered as an advantage, so that water is not penetrating through the valve and heating element when the pump is inactive.

Taking the above considerations into account, the inventors have realized the following embodiment and its equivalents as the optimal process of coffee brewing:

Measure the ambient temperature by using a temperature sensor 18 in the heating element 16, so that cooling from the heating element 16 to the funnel can be estimated. For the purpose of calibration, consider if the measured temperature is realistic. The estimation preferably requires a predefined model dependent on, for example, the length and diameter of the pipe connecting the heat element 16 and the outlet 48.

Then, connect a power supply to the heating element 16.

Wait until the heating element 16 temperature is equal to or greater than a first predetermined or target temperature. For example, the predetermined temperature may be approximately 90° C.

Once the first predetermined temperature is achieved, activate the pump 14 for a first period of time (for example, approximately two seconds) until the heating element 16 is filled with water. Measure a possible a decrease of the value of the temperature sensor 18.

Deactivate the pump 14 for a second period of time (for example, approximately two seconds) to heat the water in the heating element until the heating element 16 temperature is equal to or greater than a second predefined temperature. The first period of time during which the pump is activated and the second period of time during which the pump is deactivated may be the same or different.

Restart (reactivate) the pump 14 at an estimated throughput level. That is, restart the pump with a corresponding voltage level that provides the estimated throughput level, thereby providing the desired output temperature. The throughput level may be estimated by the PCB 19 using a predefined model, the estimation based at least in part on the estimated temperature reduction and the measured ambient temperature.

Check the outlet temperature and possibly adjust the predefined model for calculating the output temperature, so that the flow is adjusted accordingly.

Also control the predefined model for account for whether the estimated air pressure is too low. If so, the outlet temperature of the water is decreased.

Introduce a break if interval brewing or extended brewing has been requested.

Repeat the two last mentioned steps until the power consumption of the pump 14 indicates dry running. Switch off the pump 14.

Switch off the heating element 16 and maintain the temperature of the coffee flask 72 by a heating element. This may be the same heating element 16 that heated up the water in the pump, or an independent heating element. If an independent heating element is used, it should also include an additional temperature sensor with over-temperature protection. If using the same heating 16 element for both functions, the heating element 16 might be moved and/or insulated somewhat from the surface of the coffee machine 10.

One of the advantages of the present invention is that it provides better control of the temperature of the water when it first hits the ground coffee. Furthermore, it enables the coffee machine 10 to be more robust against changes in the environment related to pressure, humidity and temperature without degrading the quality of the coffee significantly.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for brewing coffee in a coffee machine including a water reservoir, a heating element, a water pump, and a coffee flask with a filter holder positioned above the coffee flask, the method comprising:

measuring an ambient temperature in the coffee machine with a temperature sensor;

estimating a temperature reduction of water from the heating element to the filter holder using a predefined model;

providing power to the heating element, the heating element heating water from the water tank, the water then passing from the heating element through a conduit to the filter holder;

when a temperature of said heating element reaches a first predefined temperature, activating the water pump for a first time interval until the heating element is filled with water;

disabling the water pump for a second time interval until the temperature of the water in the heating element has reached a second predefined temperature;

estimating a throughput level in the heating element that provides a predefined output temperature of the water when the water contacts ground coffee beans contained in the filter holder, the throughput level being based on the estimated temperature reduction and measured ambient temperature; and activating the water pump with a voltage level that provides the estimated throughput level.

2. The method according to claim 1, further comprising:
monitoring an actual temperature reduction, and if the actual temperature reduction differs significantly from the estimated temperature reduction, then:
estimating a modified throughput level in the heating element that provides the predefined output temperature of the water when the water contacts the ground coffee beans contained in the filter holder using an adjusted estimated temperature reduction based on an adjusted predefined model and the measured ambient temperature; and
altering the pump voltage level to a different voltage level that provides the estimated modified throughput level.

3. The method according to claim 1, wherein the second predefined temperature is equal to the first predefined temperature.

4. The method according to claim 1, wherein the predefined output temperature is in the range of between approximately 90° C. and approximately 96° C.

5. The method according to claim 1, wherein the second time interval is equal to the first time interval.

6. The method according to claim 1, wherein the first time interval is approximately two seconds.

7. The method according to claim 1, wherein the heating element includes one or more metal elements and one or more silicone layers in thermal contact with the one or more metal elements, the one or more silicone layers defining one or more channels through the thermal element from which the water flows into the conduit.

8. The method according to claim 7, wherein the one or more metal elements consists of two metal elements, the one or more silicone layers being positioned between the two metal elements.

9. The method according to claim 8, wherein the two metal elements are composed of aluminum.

10. The method of claim 1, wherein the filter holder includes a rotatable ring for aroma control.

11. The method of claim 1, wherein the coffee machine further includes a water outlet for dispensing water onto the ground coffee contained in the filter holder.

* * * * *